March 5, 1974  J. J. GILBERT ET AL  3,795,721
METHOD FOR MOLDING SIMULATED BRICK AND MOLD THEREFOR
Filed March 13, 1972
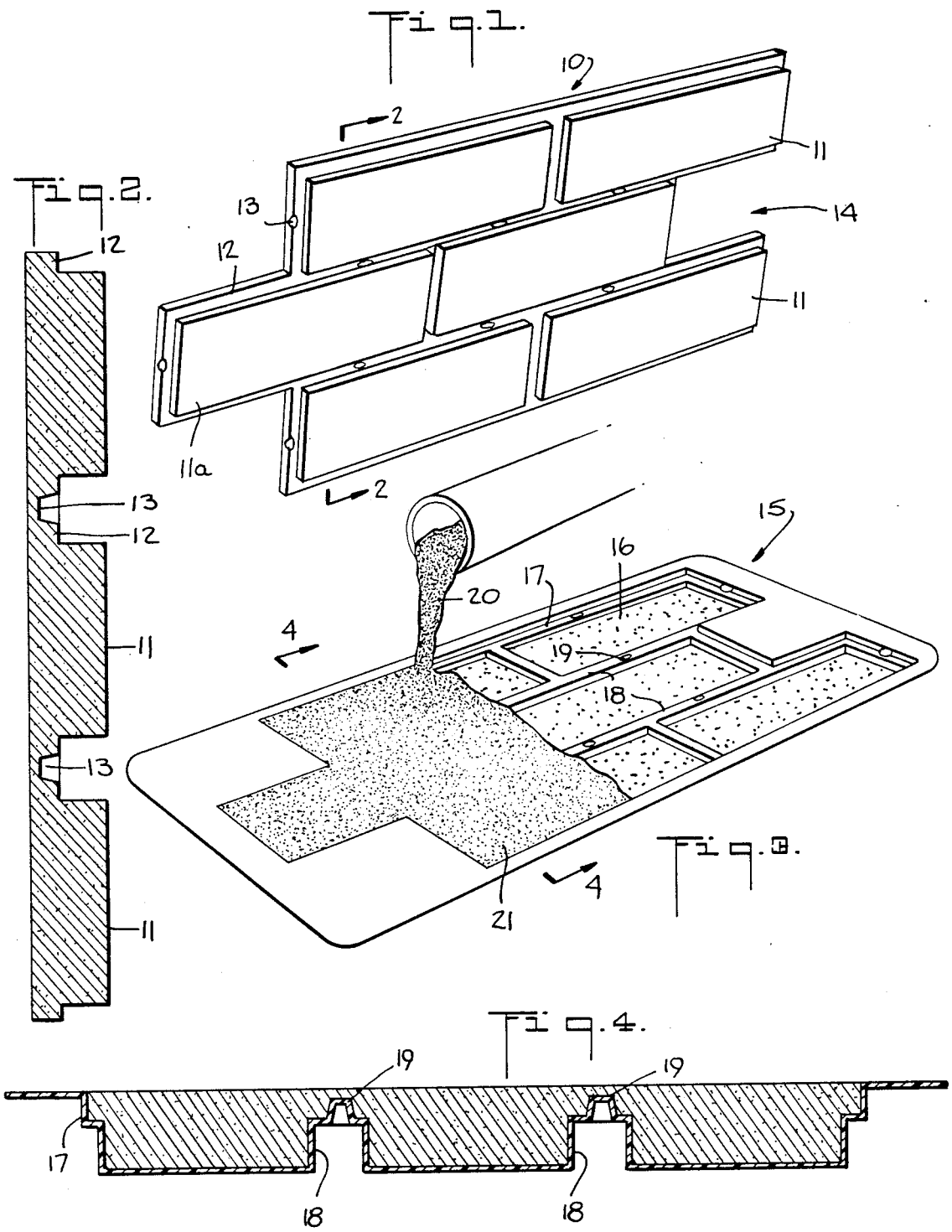

United States Patent Office 3,795,721
Patented Mar. 5, 1974

3,795,721
METHOD FOR MOLDING SIMULATED BRICK AND MOLD THEREFOR
Jack J. Gilbert and William P. Kinneman, Jr., Suffern, N.Y., assignors to Brick It Corporation, Spring Valley, N.Y.
Filed Mar. 13, 1972, Ser. No. 233,890
Int. Cl. B29h 7/20
U.S. Cl. 264—42     6 Claims

ABSTRACT OF THE DISCLOSURE

Process for producing simulated brick or stone in which a wet mixture of Portland cement and sand, either with or without filler and coloring materials, an aerating agent and calcium chloride is placed in a water impervious mold having a face wall with the desired pattern thereon and a re-entrant wall upstanding from the face wall and the mixture is cured in the mold for at least five hours at a relative humidity of 100% before the mold is removed. Also, a plastic mold therefor for forming a module of brick units with intervening mortar lines having nailing cavities therein.

---

This invention relates to the molding of facing material which simulates stone or brick and which is used for construction purposes, particularly for the exterior facing of buildings, walls, etc.

It is known in the art to make facing materials for the covering of walls, etc., and which simulate brick or stone (hereinafter referred to as "brick") from Portland cement, water and sand mixtures, either with or without fillers and/or coloring materials, but those heretofore known have been relatively fragile or brittle. Accordingly, such facings have not been entirely satisfactory if they are separately made and later installed by securing them to a wall because of the loss during handling and application. In addition, the facing material has been relatively heavy and expensive to transport, and due to the curing times before being handled, it has been expensive to manufacture such facings. To avoid such problems, resort has frequently been had to the application of the unhardened mixture directly on a wall.

It is also known in the art to use molds of flexible, solid plastic material, such as celluloid and other synthetic resins for molding articles of a mixture containing Portland cement, but it has been found that with conventional methods of curing or hardening of such a mixture therein, the resulting product is relatively fragile and brittle and does not have a hard surface on the viewed face. In such conventional methods, the molds usually are removed as soon as the mixture has hardened sufficiently to be self-supporting, little effort is made to control the humidity of the curing atmosphere and frequently, direct heating of the mixture is employed to accelerate the curing.

From experiments which have been conducted, it has been found that the conditions under which the mixture is cured are critical if a strong article is to be produced. It must be borne in mind that the hardening is not merely a drying process; instead, a chemical reaction takes place in the mixture and the rate and results thereof is dependent upon the curing conditions.

Our experiments have shown that in order to obtain a simulated brick facing unit which has substantially improved fracture strength, the unit should be cured in the mold in an atmosphere having a relative humidity of at least about 100% for a period longer than that required to cure the unit to the point where it is hard and self-sustaining. Prior to initial hardening or setting, the unit should not be subjected to external heating, such as by sunlight, lamps, steam, etc.

While the theory as to why such control of the curing conditions affects the fracture strength is not entirely clear, the resulting, hardened unit has a greater fracture strength and a face which is harder and more resistant to abrasion. Furthermore, it has been found that the weathering of the unit is improved.

In accordance with the process of the invention, a wet mixture of Portland cement, sand and optionally, fillers and/or coloring material, the amount of water being sufficient to permit working, is placed in a water impervious flexible mold which has a face wall with the desired brick pattern on its interior face and re-entrant upstanding walls, the face wall with the other walls forming an integral water impervious receptacle, and the mixture is cured to hardness and is kept in the mold for a period of at least five hours. The surface of the mixture not covered by the walls of the mold is covered by a water impervious film or curing compound or is exposed to the atmosphere at a relative humidity of at least about 100%, without external heating of the mixture. The ambient temperature preferably is in the range from 60–100° F. After the minimum curing time of five hours under such conditions, the curing may be continued in the mold under atmospheric conditions but at temperatures above 32° F., and it is possible to transport the partially hardened mixture in the mold from the place of manufacture to the place of installation without damage thereto after twenty-four hours of curing. However, preferably in order to increase the strength the curing under the initial 100% humidity conditions is continued for at least twenty-four hours and if possible, for seven to fourteen days.

The mold itself preferably is made of a synthetic resin such as polystyrene, polyethylene, methyl methacrylate, celluloid, polypropylene, copolymers, etc., or may be made of rubber. Preferably, it has several cavities for forming a group or module of brick units joined by mortar lines and has projections for forming nailing cavities in the mortar lines of the module but which do not extend to the opposite surface thereof.

One object of the invention is to provide an improved method for manufacturing simulated brick facing units or modules which have a greater fracture strength, harder surface and greater resistance to weathering than those heretofore known.

Another object of the invention is to provide a novel mold construction for the molding of simulated brick facing units or modules.

These and other objects of the invention will be apparent from the following detailed description of preferred embodiments thereof, which description should be considered in conjunction with the accompanying drawings in which:

FIG. 1 is a perspective view of a brick simulating module manufactured in accordance with the process of the invention and with the mold of the invention;

FIG. 2 is a cross-section of the brick module shown in FIG. 1, and is taken along the line 2—2 shown in FIG. 1;

FIG. 3 is a perspective view of the mold of the invention partially filled with a mixture from which the brick simulating module is made; and FIG. 4 is a cross-section of the embodiment shown in FIG. 3, and is taken along the line 4—4 shown in FIG. 3.

With reference to FIGS. 1 and 2, the brick module 10 comprises a plurality of simulated brick units 11 joined together and integral with mortar line portions 12, the mortar line portions 12 having spaced cavities 13 therein which do not extend through the thickness of the module and which provide thin sections in the mortar line portions for the purpose of fastening, e.g. by nails, screws, etc., the module to a surface, such as the exterior wall of a building. After the module is fastened to the surface, the mortar line portions 12 are filled with a cement or grout to simulate the mortar lines of a conventional brick surface. Preferably, the grout remains flexible after setting and may, for example, be an acrylic resin emulsion mixed with sand. It will be noted that the thickness of the mortar line portions 12 is less than that of the remainder of the module, so that if fracture should occur during the fastening process, the fracture will normally occur along the mortar line portion 12 and the fracture will be subsequently covered by the cement or grout. Preferably, the cavities 13 do not extend through the thickness of the module 10, and are located away from the vertical mortar lines as shown in FIG. 1.

It will be noted that the configuration of the module 10 is such that when the modules are placed in end-to-end relation, the extending brick unit 11a will fit within the recess 14 in the next adjacent module.

The mold of the invention is shown in FIGS. 3 and 4, and is designated generally by the reference numeral 15. The mold 15 is formed from a solid, flexible, moisture impervious material, such as a synthetic resin or rubber of the type described hereinbefore. The wall thickness thereof may be relatively thin, e.g. of the order of 0.003 inch–0.01 inch.

The mold has a face wall 16 which is integral with a plurality of re-entrant upstanding walls 17 and 18, the wall 17 being a peripheral wall having a height above the face wall 16 at least equal to the desired thickness of the simulated brick module 10. The other walls 18 are arranged in the desired pattern of the mortar lines and have a height above the face wall 16 which is less than the height of the peripheral wall 17 above the face wall. A plurality of projections 19 facing away from the face wall 16 extend from the walls 18 to provide the fastening cavities 13. Preferably, the combined height of a wall 18 and a projection 19 thereon, above the face wall 16, is less than the thickness of the simulated brick module 10 and less than the height of the wall 17 above the face wall 16.

The interior surface of the face wall 16 corresponding to what will eventually be the viewed faces of the brick units 11 is provided with a pattern in the form of projections and/or recesses to provide a pattern on the viewed faces of the brick units 11 which simulates the appearance of bricks or any other desired appearance.

When thermoplastic material is used for the mold, it may be formed in any conventional manner, such as thermoforming, vacuum molding, etc.

The mold is used to form the module 10 by supplying the mixture 20 to the mold 15 and levelling the exposed surface 21 of the mixture so that it is flush with the upper edge of the peripheral wall 17. Pressure is applied to the mixture in the mold, such as by a screed, to make certain that all of the mold cavities are filled with the mixture 20. The mixture 20 is then cured in the mold 15 as described hereinafter.

Preferably, prior to placing the mixture 20 in the mold 15, the interior surfaces of the mold are coated, such as by spraying or brushing, with a release agent which may be any release agent conventionally used. The agent may, for example, be tall oil, safflower oil or peanut oil, alone or in a solution of mineral spirits.

The mixture 20 which is used to form the brick unit or module may be any conventional Portland cement-sand mixture used for such purposes, but preferably, the mixture comprises the following by weight:

Portland cement—0.75–1.5 parts.
Mason's sand (passed by a 16 mesh or finer screen)—1–3 parts.
Solid filler—Up to 1.5 parts.
Coloring material—Up to 10% of the dry mixture.
Calcium chloride—Up to 3% of the cement content.
An aerating agent—Up to an amount which will provide an air content of about 25%.
Water—Sufficient to form a wet, flexible mixture, i.e. a slurry, either paste-like or self-levelling.

Examples of solid fillers are fine cinders, ground asbestos and fine fiber glass, fly ash, etc. Examples of coloring materials are iron oxide, lamp black, chromium oxide, etc.

The addition of calcium chloride has been found to improve the strength of the brick unit or module and to reduce the required curing time. The calcium chloride is used in its commercial form which contains two mols of water and may, for example, be calcium chloride sold by the Dow Chemical Company under the trade mark "Dow Flake." Other chlorides which are not deleterious may be used. When used, the calcium chloride content is from 0.5–3%, and preferably, 1–2%, by weight of the cement content.

The use of aerating agents is preferred since they not only reduce the weight of the module but also improve the resistance of the module to fracture by freezing and thawing. In addition, the appearance of the brick surface is improved, and less of the other materials are required to produce a given volume of modules. Although the inclusion of air in the module, as a result of using an aerating agent, decreases the strength of the module, the use of an aerating agent makes the mix easier to work and therefore, permits the use of less water. Since the amount of water used in the mix affects the module strength and since less water increases its strength, the loss by using an aerating agent is partly offset due to the use of less water.

The density of the mix obtained without the use of an aerating agent is about 161 lbs. per cubic foot. As the aerating agent content is increased, the density decreases, and good results are obtained at a density as low as about 120 lbs. per cubic foot, or an air content of about 25%. However, with a density of 103 lbs. per cubic foot, there is a drastic reduction in strength, and experiments have shown that an air content of about 16% is the optimum. Accordingly, the broad range is 10% to 25% air whereas the preferred range is 14–18%. Since the air voids are not interconnected in the resulting module, the module remains impermeable.

The function of the aerating agent is to produce dispersed air bubbles in the wet mix, and there are many well-known such agents. Examples are dodecyl benzene sulfonate or a phosphate free detergent such as the detergent sold by the Procter & Gamble Co. under the trade mark "Ivory" liquid. An increase in the amount of the aerating agent reduces the density and vice versa.

In the specific examples set forth hereinafter, the procedures for preparing the mixture and filling the mold are essentially the same. The water content of the sand is measured by weighing a sample thereof and then drying it to a constant weight at 250° F. The water content usually is about 5–8% of the weight of the sand, and is included in determining the amount of the mix water.

The sand is weighed into a motor mixer and calcium chloride dissolved in 5–10 times its weight of water (also included in the mix water) is added to the sand mix which is mixed for approximately one minute. The pigments are weighed and added to the sand-calcium chloride mix. The aerating agent is weighed and dissolved in the remainder of the mix water which is added to the mixer and the mixer is run until the color is uniform, usually about 1–2 minutes. Thereafter the cement is weighed and added to the mixer and the mixer is run for about two minutes. The mixer blades are scraped and the mix consistency is noted. If additional water is required to obtain the desired consistency, it is added, and the mixer is again run for a short time. After the mix is prepared it is placed in the mold, pressed with a screed and leveled with a levelling board. Thereafter, the mold containing the mixture is exposed to the curing conditions described, with the exposed surface of the mixture level.

During the initial curing, the high humidity may be maintained by covering the surface of the mix not covered by the walls of the mold 15 with a moisture impervious film, such as a plastic film or a curing compound or by enclosing the mold in a moisture impervious bag. However, in the specific examples set forth hereinafter, each mold was placed in a wooden tray, and a group of trays were stacked with separators therebetween. The spaces between the edges of the trays were sealed with masking tape and the uppermost tray was covered with a thin, impervious plastic sheet.

Within eight hours of the commencement of curing, the exposed surface of the mixture becomes hard to the touch due to curing of the exposed surface, the time taken being called the setting time. However, if the mold is then removed, it is found that the module is relatively fragile even though the mixture may be cured sufficiently to be self-supporting and to maintain its shape. This indicates that the mixture has not yet cured sufficiently. If the mold is removed at this point and the module is permitted to continue to cure under ordinary atmospheric conditions, the resulting module is still relatively fragile. Even if the mold is not removed after the mixture has set and it is further cured under ordinary atmospheric conditions, no substantial improvement in strength is obtained. However, if the mixture is cured in the mold for at least five hours under 100% humidity conditions and is further cured under such conditions for at least 19 additional hours, either with or without removal of the mold, the substantially improved strength hereinafter described is obtained. In other words, curing in the mold for a period in excess of five hours usually is required to permit handling of the module and curing under 100% humidity for at least 24 hours is required to provide the desired strength.

During the curing of the mixture, the temperature between the trays was measured, and it was found that it would reach a maximum and then gradually decrease to room temperature.

The following mixes were prepared as described above and were cured in trays as described above for at least 24 hours:

TABLE I

| Ex. | Mason sand, lbs. | Portland cement, lbs. | Cement CaCl₂, lbs. | Red, gms. | Yellow, gms. | Aerating agent, gms. | Water, lbs. |
|---|---|---|---|---|---|---|---|
| 1 | 90 | 45 | None | 510 | 612 | 4 | 18-20 |
| 2 | 90 | 45 | 0.9 | 510 | 612 | 4 | 18-20 |
| 3 | 90 | 45 | 0.9 | 510 | 612 | 3 | 18-20 |
| 4 | 90 | 45 | 0.9 | 510 | 612 | 4 | 18-20 |
|   | 90 | 45 | 0.9 | 510 | 612 | 5 | 18-20 |

In Examples 1–3 and 5, the cement used was a cement designated as a Type 1 cement by the American Society of Testing Materials. In Example 4, an ASTM Type III cement was used.

The cement colors were bright cement red No. 198 and bright cement yellow No. 2097 sold by the Landers-Segal Color Co., and the aearating agent was the aforesaid "Ivory" liquid. Four samples of the modules prepared from the mixtures of Example 3, after curing in the mold for 24 hours, were removed and one pair of samples was further cured while immersed in lime water, one of the pair for seven days and the other for 14 days. The other pair of samples was further cured under atmospheric conditions, one of the other pair for seven days and the other for 14 days.

After curing for the various times hereinafter specified individual bricks were broken from the modules and were tested for fracture strength. The bricks were three-quarters of an inch thick, 2¹⁵⁄₃₂ inches wide and about eight inches long. The strength was tested by placing a brick on top of two parallel half-inch cylindrical steel rods spaced seven inches on centers with the length of the brick extending across the rods and with its thickness dimension extending upwardly from the rods. A third half-inch cylindrical steel rod, parallel to the other rods, was placed on top of the brick midway between the other two rods, and force was applied downwardly on the third rod until the brick fractured. The following Table II shows the test results, the fracture strengths reported being the average of the tests on at least five bricks and the setting times and tray stack temperatures being the average of at least three separate mixes:

TABLE II

| Mixture | Density, lbs./cu. ft. | Setting time, hours | Maximum temp., °F. | Fracture strength, lbs. | | |
|---|---|---|---|---|---|---|
|  |  |  |  | 24 hrs. | 7 days | 14 days |
| Example: |  |  |  |  |  |  |
| 1 | 120-125 | 8 | 86 | 50 | 90 | 130 |
| 2 | 120-125 | 3½ | 118 | 90 | 125 | 180 |
| 3A | 135 | 3 | 122 | 100 | ¹160 | ¹180 |
| 3B | 135 | 3 | 122 | 100 | ²125 | ²135 |
| 4 | ------ | 2 | 130 | 140 | 180 | 200+ |
| 5 | 103 | 4 | 115 | 40 | 60 | 85 |

¹ Cured in lime water after 24 hours.
² Cured in open air after 24 hours.

It is clear from Table II that if calcium chloride is omitted (Example 1) the setting time is longer and the fracture strength is significantly lower. With calcium chloride (the remaining examples), the setting time is shortened and the strength is improved except when the air content is high (Example 5). Continued curing after 24 hours under the initial conditions (Example 2) as compared to in the open air (Example 3B) produces a substantial increase in strength at 14 days, but produces the same strength in 14 days as curing after 24 hours in lime water. The best strength in 14 days is produced (Example 4) with continued curing under the initial conditions and using ASTM Type III cement which is a "high early" strength cement.

From the foregoing test results and other tests which have been conducted, it is apparent that the hardened mixture cannot be removed from the 100% humidity curing conditions a soon as it has set, because the module does not have the desired fracture strength even if it is then cured for a long time under ordinary atmospheric conditions. Furthermore, even if the mixture has set, it should not be removed from the mold in less than five hours in order to avoid damage thereto and to be certain that it has set sufficiently to permit handling. To obtain the desired fracture strength, the module should be cured under 100% humidity conditions, preferably in the mold, for at least 24 hours. After 24 hours of curing under such conditions, the module may be removed from the mold or left therein, and preferably it is then further cured for 7-14 days under 100% humidity conditions to provide an improved fracture strength. However, if desired, further curing may proceed under ordinary atmospheric conditions and a fracture strength greater than that obtained with prior art curing will result, although it will not be as high as that obtained when both calcium chloride is used in the mix and the further curing is under 100% humidity conditions.

The use of chlorides, such as calcium chloride, in the mixture not only provides a greater fracture strength earlier in the curing, thereby facilitating handling, but also results in the greatest fracture strength in 14 days permitting earlier shipping and installation of the module.

The use of an aerating agent not only reduces the weight of the module and makes it more resistant to freezing and thawing, but also does not substantially affect the fracture strength provided that the air content does not exceed about 25%. Furthermore, as is shown hereinafter, the use of an aerating agent in such proportions does not reduce the water absorption properties of the module below those of clay brick.

A single brick made from the mixture of Example 2 was cured in a sealed bag for a week and was then removed form the bag and weighed. In three weeks of subsequent drying with a relative humidity of less than 30%, it lost only 2% of its weight. When it was then immersed in water for 24 hours, it regained only 1½% of its weight showing that its absorption characteristics exceed standard absorption specifications for clay brick.

It will be apparent to those skilled in the art that single brick units, rather than a module of brick units, may be made with an appropriate mold using the process of the invention and that the pattern on the interior face of the face wall may taken any desired form. Also, patterns may be included on other walls of the mold as desired, and although the preferred cement mixtures have been described, other cement mixtures with similar properties may be used.

What is claimed is:

1. A process for producing a simulated brick comprising filling a mold of solid, flexible material having a face wall and a re-entrant wall upstanding from said face wall, said walls, forming a wet mixture receiving receptacle and the interior surface of said face wall having a pattern there on corresponding to the patten desired on the face of said brick, with a wet mixture comprising, by weight, 0.75 to 1.5 parts of portland cement, 1 to 3 parts of sand which is passed by a 16 mesh screen, up to 1½ parts of a solid filler material, up to 10% of a coloring material, calcium chloride up to 3% of the cement content, up to an amount of an aerating agent sufficient to produce up to a 25% air content in the mixture and water sufficient to form a slurry of the mixture, initially curing the mixture to hardness in said mold at atmospheric pressure and an ambient temperature in the range from 60–100° F. but without direct exposure thereof to a heat source and with the surface thereof subjected to a relative humidity of about 100% for a period of at least five hours before removing the mold from the hardened mixture, and thereafter further curing the hardened mixture at atmospheric pressure and ambient temperature but at a temperature above 32° F. for at least an additional nineteen hours under about 100% humidity conditions.

2. A process as set forth in claim 1, wherein after said further curing, the hardened mixture is cured under atmospheric conditions at a temperature above 32° F. for an additional period of time of at least seven days.

3. A process as set forth in claim 1, wherein after said further curing, the hardened mixture is cured under lime water for at least seven days.

4. A process as set forth in claim 1, wherein the mixture is cured in the mold and under about 100% humidity conditions for at least seven days.

5. A process as set forth in claim 1, wherein the calcium chloride content is from 0.5 to 3% of the cement content.

6. A process as set forth in claim 1, wherein the content of the aerating agent is sufficient to produce an air content in the mixture of between 10% and 25%.

References Cited
UNITED STATES PATENTS

| | | | |
|---|---|---|---|
| 3,634,567 | 1/1972 | Yang | 264—DIG 43 |
| 2,880,101 | 3/1959 | Ulfstedt | 106—98 |

OTHER REFERENCES

Lea et al., The Chemistry of Cement and Concrete, Edward Arnold Publ., London, 1956, p. 34.

DONALD E. CZAJA, Primary Examiner

M. I. MARQUIS, Assistant Examiner

U.S. Cl. X.R.

106—88, 89; 264—42, DIG 43, 82, 333